United States Patent Office 3,542,739
Patented Nov. 24, 1970

3,542,739
ONE-COMPONENT STOVING LACQUERS PREPARED BY THE MIXED POLYMERIZATION OF VINYL MONOMERS WITH UNSATURATED COMPOUNDS
Heinrich Krimm, Krefeld-Bockum, Georg Malamet, Krefeld, Hermann Schnell, Krefeld-Urdingen, and Bernd Peltzer, Krefeld-Gartenstadt, Germany, assignors to Farbenfabriken Bayer Aktiengesellschaft, Leverkusen, Germany, a corporation of Germany
No Drawing. Filed Jan. 22, 1968, Ser. No. 699,378
Claims priority, application Germany, Jan. 27, 1967, F 51,361
Int. Cl. C08g 22/34, 22/06
U.S. Cl. 260—77.5                         5 Claims

ABSTRACT OF THE DISCLOSURE

One-component stoving lacquers are provided as well as a process for their preparation wherein vinyl monomers are polymerized with unsaturated compounds containing reactive hydrogen atoms and unsaturated masked isocyanates wherein the unsaturated compound is an unsaturated alcohol and the masked isocyanate is β-isocyanatoethyl methacrylate or acrylate masked with an oxime.

---

The present invention relates to a process for the production of firmly adhering, one-component stoving lacquers based on acryl resins and with a good resistance to chemicals, the lacquers containing as an essential constituent masked β-isocyanatoethyl acrylate or methacrylate.

It is known to produce copolymers of β-isocyanatoethyl methacrylate or acrylate in free and masked form (see U.S. Pats. 2,882,260 and 2,821,544).

Mixed polymers containing free isocyanate groups are however not very suitable for lacquer purposes on account of their low storability.

However, mixed polymers into which is incorporated by polymerization, in addition to a monomer containing hydroxyl groups, a β-isocyanatoethyl methacrylate or acrylate the isocyanate group of which is protected by the masking agents usual in the art, such as phenols or lactams, are also not very suitable as stoving lacquers, since, with the stoving in the short times required in the lacquer art, cross-linking only takes place at very high temperatures.

Furthermore, the reaction products of isocyanates with oximes, such as acetoxime or cyclohexanone oxime, have long been known [see Ber. dtsch, Chem. Ges. 22, 3101 (1889)]. All attempts to make such adducts suitable for technical use as agents splitting off isocyanate are counteracted by the strong discolorations of the reaction products in question which formerly were found to occur [Liebig's Ann. Chem. 562, 213 (1949)].

It is therefore an object of this invention to provide lacquer coatings which have good adhesion, good gloss, high elasticity, good resistance to yellowing and chemicals and which resist color change even in clear coatings. Another object of this invention is to provide coating compositions containing masked β-isocyanatoethyl methacrylate or acrylate which have improved properties.

Another object of this invention is to provide coatings based on oxime masked isocyanates which have improved properties.

The foregoing objects and others which will become apparent from the following description are accomplished in accordance with the invention, generally speaking, by providing coatings with a good gloss, a high elasticity and especially a high adhesion strength and resistance to yellowing and chemicals obtained from β-isocyanatoethyl methacrylate or acrylate masked with oximes and unsaturated alcohols together with vinyl monomers. For carrying out the process according to the invention, it is sufficient to use stoving temperatures above about 150° C., which can even be lowered to about 130° C. with the addition of tertiary amine catalysts, in order to produce a complete cross-linking.

The subject of the present invention is thus a process for the production of one-component stoving lacquers by mixed polymerization of vinyl monomers with unsaturated compounds which contain reactive hydrogen atoms and unsaturated masked isocyanates, which consists in using unsaturated alcohols as unsaturated compounds with reactive hydrogen atoms and β-isocyanatoethyl methacrylates or acrylates masked with oximes as unsaturated masked isocyanates.

The oxime adducts of β-isocyanatoethyl methacrylate or acrylate to be used according to the invention can be prepared by reacting β-isocyanatoethyl acrylate or β-isocyanatoethyl methacrylate with oximes of aldehydes and ketones, such as acetaldehyde, propionaldehyde, butyraldehyde, acetone, cyclohexanone, benzaldehyde, benzophenone, terephthaldehyde, optionally in solvents such as petroleum ether or cyclohexane.

Vinyl monomers within the terms of the invention include, for example, amides and nitriles of methacrylic or acrylic acid, substituted styrenes, α-methyl styrene and vinyl acetate, but esters of methacrylic or acrylic acid and styrene are preferred.

Unsaturated alcohols to be used according to the invention include, for example, allyl alcohol, oxyalkylated p-isopropenylphenol and N-methylol methacrylamide or acrylamide, but advantageously methacrylic or acrylic acid hydroxyalkyl esters, such as the 2-hydroxyethyl ester or 2-hydroxypropyl ester of methacrylic or acrylic acid.

The mixed polymers according to the invention can be prepared in the dry state, in solution or in dispersion and, as a catalyst, the usual radical formers such as peroxides, hydroperoxides, azodiisobutyronitriles or redox systems can be employed.

The coatings can be used on wood or metal, for example as an automobile finish.

The invention is further illustrated by the following examples in which parts are by weight unless otherwise specified.

EXAMPLE 1

A solution of about 245 g. of ethyl acrylate, about 150 g. of styrene, about 50.5 g. of 2-hydroxypropyl methacrylate and about 80 g. of β-isocyanatoethyl methacrylate masked with acetoxime [prepared by reacting equimolar quantities of the components in petroleum ether, colorless crystals of M.P. 65–67° C. (from ethyl acetate)] in about 500 g. of xylene is heated in a nitrogen atmosphere for about 20 hours at about 80° C. after about 5 g. of azodiisobutyronitrile have been added as a catalyst and 3 g. of tert.-dodecylmercaptan as a regulator.

Thereafter, the conversion is 100% and a colorless, clear, viscous polymer solution with a solid content of about 50% is obtained.

About 200 g. of titanium dioxide pigment (rutile) and about 1 g. of calcium naphthenate (4% liquid) are added to about 200 g. of this polymer solution. This mixture is triturated twice on a three-roll stand.

The paste thus obtained is formed into a lacquer with about another 300 g. of the polymer solution which has been prepared, and, after adding;

2.5 g. of silicone oil (1% in xylene);
10 g. of butanol; and
15 g. of butyl glycolate, is adjusted with xylene/butanol (3:1) to a spraying viscosity of 20 seconds in a DIN flask No. 4.

For the commercial lacquer test, the lacquer is sprayed onto glass sheets and also onto steel sheets with thicknesses of 0.1 and 0.5 mm., respectively. After exposure to air for about 10 minutes, the sheets are stoved for about 30 minutes at 150° C.

The values of the lacquer films thus obtained and as indicated in the tables, are compared with the values of the lacquer films which are based on a polymer solution prepared for comparison purposes and produced as follows:

Comparison product

For comparison purposes, a mixed polymer of ethyl acrylate, styrene and acrylamide is used, in which the major part of the amide groups has been transformed into N-butoxymethylamide groups and which exists as a 50% solution in xylene-butanol (1:1).

The stoved blue lacquer films are characterized by a high gloss, a good adhesion strength and a good color tone constancy under temperature stress.

Lacquer films based on the polymer prepared for comparison purposes show a lower bonding strength and a less satisfactory color tone stability under temperature action.

EXAMPLE 2

A solution of about 260 g. of ethyl acrylate, about 20 g. of butyl acrylate, about 100 g. of styrene, about 13 g. of methyl methacrylate, about 50.5 g. of 2-hydroxypropyl methacrylate and about 75 g. of the β-isocyanatoethyl acrylate masked with acetoxime (prepared by heating equimolar quantities of the components in benzene, colorless crystals of M.P. 59–61° C., from 1,2-dichloropropane) in about 500 g. of xylene is polymerized similarly to Example 1 after adding about 5 g. of dibenzoyl peroxide and about 3 g. of tert.-dodecyl mercaptan.

A clear, colorless, viscous solution with a solid content of about 50% is obtained, and this solution can be further processed similarly to Example 1 to form lacquers.

EXAMPLE 3

A mixture of about 280 g. of ethyl acrylate, about 150 g. of styrene, about 50 g. of 2-hydroxypropyl methacrylate, about 80 g. of the acetoxime adduct of β-isocyanatoethyl methacrylate, about 100 g. of dimethylformamide and about 0.35 g. of sodium pyrosulphite is added to a solution of about 5 g. of sodium lauryl sulphate as emulsifier and about 1 g. of potassium persulphate as catalyst, in about 1 liter of water. This dispersion is heated while stirring vigorosly under a nitrogen atmosphere to about 60° C. After a short time, an exothermic reaction commences and the polymerization is ended after about 2 hours. A colorless dispersion of low viscosity is obtained

| Cross-linking | Pendulum hardness according to König | Penetration depth according to Philips, μ | Erichsen depression, m.m. | Bonding strength (lattice section) | Xylene test [1] | Gloss according to Gardner (20° angle) 30h. 150° C. | 30h. 220° C. |
|---|---|---|---|---|---|---|---|
| Acetoxime masked isocyanate | 170″ | 4.4 | 6.8 | Very good | fulfilled | 80 | 74 |
| N-butoxymethyl acrylamide | 165″ | 5.0 | 6.4 | Satisfactory | do | 80 | 61 |

| Cross-linking | Maintenance of gloss after 72 hours 180° C. | Yellowing [2] 30h. 150° C. | 72h. 180° C. | Resistance to chemicals Water 100° C., h. | 1% detergent solution 100° C., h. | 5% NaOH 25° C., h. | 5% acetic acid 25° C., h. | 10% Na₃PO₄ 60° C., h. |
|---|---|---|---|---|---|---|---|---|
| Acetoxime masked isocyanate | 60 | −10.2 | −30.2 | 50 | 40 | 250 | 75 | >600 |
| N-butoxymethyl-acrylamide | 29 | −10.6 | −39.9 | 40 | 30 | 200 | 60 | 600 |

[1] The xylene test was carried out as follows: A pad of cotton wool moistened with xylene and covered with an hourglass wetted the lacquer film in 15 minutes. After a regeneration time of 2 hours, the lacquer film did not show any damage.
[2] The yellowing was recorded with the electric remission photometer of Messrs. Carl Zeiss, using filter 7(420 mμ) and filter 1(680 mμ). What is indicated is the value of the difference of filter 7 minus filter 1.

| Cross-linking | Resistance to chemicals Water 100° C., h. | 1% detergent solution 100° C., h. | 5% NaOH 25° C., h. | 5% acetic acid 25° C., h. | 10% Na₃PO₄ 60° C., h. |
|---|---|---|---|---|---|
| Acetoxime masked isocyanate | 50 | 40 | 250 | 75 | >600 |
| N-butoxymethyl-acrylamide | 40 | 30 | 200 | 60 | 600 |

The judging of the chemical resistivity was effected by the Erichsen plates being half-dipped into the agent in question. In order to obtain a differentiation between the two products, these tests were in each case continued until the lacquer films were destroyed (usually by blistering).

To 200 g. of the polymer solution to be used according to the invention, there are added 190 g. of titanium dioxide pigment (rutile), 10 g. of phthalocyanine blue and 1 g. of calcium naphthenate (4% liquid). This mixture is triturated twice on a three-roll stand.

The paste thus obtained is made into a lacquer as described and adjusted to the viscosity for spraying.

with a solid content of about 35%, which can be stoved at about 150° C. in about 30 minutes to form very hard, firmly adhering lacquer films which are resistant to solvents.

It is to be understood that the foregoing examples are given for the purpose of illustration and that any other suitable vinyl monomer, unsaturated alcohol β-isocyanatoacrylate or methacrylate, oxime or the like could be used provided the teachings of this disclosure are followed.

Although the invention has been described in considerable detail in the foregoing, it is to be understood that such detail is solely for the purpose of illustration and that many variations can be made by those skilled in the

What is claimed is:

1. Process for the production of one component stoving lacquers by mixed polymerization of vinyl monomers with unsaturated compounds which contain reactive hydrogen atoms and unsaturated masked isocyanates, characterized by the use of unsaturated alcohols as unsaturated componds with reactive hydrogen atoms and $\beta$-isocyanatoethyl methacrylate or acrylate masked with oximes as unsaturated masked isocyanates.

2. The product of the process of claim 1.

3. The process of claim 1 wherein said oxime is acetoxime.

4. The process of claim 1 wherein said vinyl monomer is styrene.

5. The process of claim 1 wherein said unsaturated alcohol is 2-hydroxy propyl methacrylate.

References Cited

UNITED STATES PATENTS

| | | | |
|---|---|---|---|
| 3,261,817 | 7/1966 | Angelo | 260—77.5 XR |
| 3,299,007 | 1/1967 | Suling et al. | 260—77.5 |

DONALD E. CZAJA, Primary Examiner

M. J. WELSH, Assistant Examiner

U.S. Cl. X.R.

117—124, 132, 148; 260—37